July 25, 1933.   G. WIKKENHAUSER   1,920,119
TELEVISION AND PICTURE TRANSMITTING APPARATUS
Filed Aug. 27, 1930
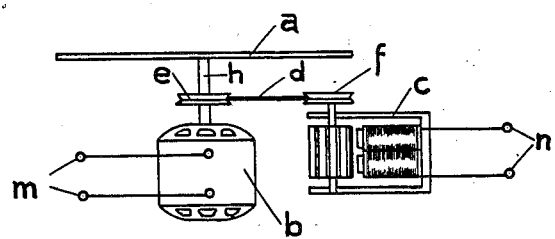
G. Wikkenhauser
INVENTOR
By: Marks & Clerk
Attys.

Patented July 25, 1933

1,920,119

UNITED STATES PATENT OFFICE

GUSTAV WIKKENHAUSER, OF BERLIN-HALENSEE, GERMANY, ASSIGNOR TO TELEHOR AKTIEN-GESELLSCHAFT, OF BERLIN-CHARLOTTENBURG, GERMANY

TELEVISION AND PICTURE TRANSMITTING APPARATUS

Application filed August 27, 1930, Serial No. 478,192, and in Germany August 29, 1929.

In the synchronization of television and picture transmitting receivers, more particularly in the case of receivers which operate with local frequency producers (tuning fork interrupters, valve generators or the like) or are kept in synchronism by the frequency transmitted from the sending apparatus, it is of special importance that the energy required for producing synchronism shall be as small as possible.

It is not possible to drive large driving motors for the picture composing device directly with the small available energy and they can only be controlled indirectly by it. For this purpose it has already been proposed to use for driving the picture composing device a large, locally fed electric motor, for instance a continuous current motor, which supplies the actual driving energy. The weak synchronous alternating current will then be used only for fine regulation which is effected either by coupling with the driving shaft a toothed wheel or a toothed drum which rotates between the poles of electromagnets through which the synchronous alternating current flows, or the control is effected by relatively complicated electric switching devices which are controlled by an auxiliary synchronous motor and which regulate the speed of revolution of the driving motor.

All the above arrangements have the common disadvantage that it is still necessary to provide a relatively great alternating current energy for driving them, apart from the complication caused by the arrangements in question or the insufficient effect.

The disadvantages referred to are overcome by the invention through the recognition of the fact that the energy required for synchronization can be reduced to a fraction of that required with the known arrangements, through the rotary part influenced by the synchronous alternating current being coupled with the source of power used for driving or with the picture composing device by an elastic transmission member.

This arrangement also has the effect that the synchronization does not take place in sudden pulsations, but with smooth transitions, so that oscillating about the synchronous speed of revolution is prevented and a steady picture is obtained in the receiver.

In the accompanying drawing a constructional example of the invention is shown diagrammatically.

In the drawing $a$ is the picture composing device which in the case illustrated has the form of a Nipkow disc and is driven by a large electric motor, for instance a continuous current motor $b$. Synchronization is effected by a synchronous auxiliary motor $c$ having the form of a phonic wheel, the rotor of which is coupled by an elastic transmission member $d$ with the shaft $h$ of the picture composing device. The transmission member $d$ may be a rubber cord, a helical spring or the like, or may be made of more rigid material, but in the latter case the cord must be capable of slipping easily on the two cord pulleys $e$ and $f$.

The currents supplying the actual driving energy for the picture composing device are connected up to the terminals $m$ and the synchronous alternating currents to the terminals $n$.

What I claim is:

A synchronizing apparatus for producing steady pictures with television and picture transmitting receivers, comprising in combination, a main motor for direct driving of the picture composing device of the receiver, an auxiliary synchronous motor, an elastic transmission member connecting the two motors effecting the synchronization, said transmission comprising an elastic belt and pulleys therefor secured to said motors respectively; whereby smooth transmission is attained, preventing oscillation about the synchronous speed.

GUSTAV WIKKENHAUSER.